United States Patent [19]

Weaver et al.

[11] Patent Number: 5,095,987
[45] Date of Patent: Mar. 17, 1992

[54] METHOD OF FORMING AND USING HIGH DENSITY PARTICULATE SLURRIES FOR WELL COMPLETION

[75] Inventors: Jimmie D. Weaver, Duncan; David L. Brown, Temple; Philip D. Nguyen; J. Michael Wilson, both of Duncan, all of Okla.

[73] Assignee: Halliburton Company, Duncan, Okla.

[21] Appl. No.: 649,773

[22] Filed: Jan. 31, 1991

[51] Int. Cl.$^5$ .............. C08L 5/00; C09K 7/02; E21B 33/138; E21B 43/04
[52] U.S. Cl. .................. 166/276; 166/280; 166/295; 166/50; 523/131; 523/402
[58] Field of Search .............. 166/276, 295, 280, 50; 523/131, 402

[56] References Cited

U.S. PATENT DOCUMENTS

| | | | |
|---|---|---|---|
| 3,854,533 | 12/1974 | Gurley et al. | 166/276 |
| 3,857,444 | 12/1974 | Copeland | 166/276 |
| 4,081,030 | 3/1978 | Carpenter et al. | 166/276 |
| 4,247,430 | 1/1981 | Constien | 166/276 |
| 4,662,447 | 5/1987 | Bolin | 166/278 |
| 4,733,729 | 3/1988 | Copeland et al. | 166/276 |
| 4,829,100 | 5/1989 | Murphey et al. | 523/131 |
| 4,850,430 | 7/1989 | Copeland et al. | 166/276 |

OTHER PUBLICATIONS

SPE 2649 Fight Sand With Sand—A Realistic Approach to Gravel Packing Derry Sparlin, Continental Oil Company, Sep. 28–Oct. 1, 1969.
SPE 6813 Proppant Transport E. J. Novotny, Exxon Production Research Company, Oct. 9–12, 1977.
SPE 16890 Gravel Pack Studies in a Full-Scale, High--Pressure Wellbore Model, D. E. Schroeder Jr., Marathon Oil Company, Sep. 27–30, 1987.
SPE 19753 Numerical Simulation of Gravel Packing, P. H. Winterfeld & D. E. Schoeder, Jr., Marathon Oil Company, Oct. 8–11, 1989.
SPE 4033 Pressure Packing With Concentrated Gravel Slurry, Derry Sparlin, Continental Oil Company and Travis Copeland, Dowell Dicision of the Dow Chemical Company, Oct. 8–11, 1972.

*Primary Examiner*—Stephen J. Novosad
*Attorney, Agent, or Firm*—Robert A. Kent

[57] ABSTRACT

A method of preparing high density particulate slurries is provided whereby slurries containing in excess of 23 pounds of particulate per gallon of fluid can be introduced into a subterranean formation. In accordance with the method, a viscosified pad fluid is introduced into a wellbore to create a filter cake in a desired zone within a subterranean formation. The high density slurry then is introduced into the formation to substantially fill any annular space present without significant settling. This permits the coating of the entire exterior surface of highly deviated casing exposed within a wellbore.

14 Claims, 1 Drawing Sheet 5,095,987

METHOD OF FORMING AND USING HIGH DENSITY PARTICULATE SLURRIES FOR WELL COMPLETION

BACKGROUND OF THE INVENTION

1. Field Of The Invention

The invention generally relates to a method of preparing a high density particulate slurry capable of being pumped into a subterranean formation. The high density particulate slurry can be utilized to perform gravel packs or effect consolidation of unconsolidated formations and is particularly useful in setting well casing in deviated wellbores.

2. Description Of The Prior Art

Increased emphasis is being placed on proper initial completion of a well as the value of nonrenewable natural resources increases and the costs associated with production escalate. While such emphasis is especially felt in the area of hydrocarbon production, production of other valuable fluids such as groundwater also emphasizes the need for efficient production techniques.

The general sequence of cased hole and open hole completions is set forth in Fitzpatrick, U.S. Pat. No. 4,917,188, the entire disclosure of which is incorporated herein. The general sequence of performing a cased hole completion includes drilling the hole, setting and cementing casing, perforating the casing, cleaning the perforations, performing sand control steps and stimulating the formation to facilitate production. The general sequence of performing an open hole completion includes drilling the hole to the bottom of the deepest target formation, setting and cementing casing to the target formation, drilling a hole through the target formation, reaming the hole to remove damage from drilling operations and stimulating the exposed largest formation. If sand control is required a gravel slurry is introduced into the wellbore and placed between a slotted liner or screen and the exposed face of the target formation.

A variety of techniques have been developed in the art to address sand control problems. One such method involves the process of injecting chemicals into the formation to effect grain-to-grain cementation. Techniques for accomplishing this successfully are perhaps some of the most sophisticated undertaken in completion work. In closely related methods, sand or other particulate are chemically treated, such as by coating with an epoxy or plastic resin, and then injected into the wellbore through a slotted liner or screen in the production zone to effect consolidation. Such a resinous particulate slurry is described, for example, in Copeland, et al U.S. Pat. No. 4,074,760 or in Murphey, et al U.S. Pat. No. 4,829,100, the entire disclosure of which is incorporated herein by reference.

While conventional gravel packing techniques are highly successful when employed in vertical wellbores, various problems arise when highly deviated or horizontal wellbores are sought to be treated.

Contemporary completion techniques incorporating provisions for sand control describe the introduction of the resin particulate slurry into the wellbore in such a fashion as to cause laminar flow of the slurry in the annulus between the wellbore and the production casing. This results in undesired settling or "voiding" in deviated wellbores which reduces production efficiency of the gravel pack. The laminar flow also allows time for the formation to dehydrate the resin slurry causing premature and often unsatisfactory setup of the consolidation adjacent the production casing.

SUMMARY OF THE INVENTION

The present invention overcomes disadvantages of the aforementioned techniques by providing improved methods for completing wells in consolidated or unconsolidated formations. The present invention provides for completion of deviated or substantially horizontal wells in consolidated or unconsolidated formations without significant settling of the particulate from around the production casing.

In a preferred embodiment of the invention, a high density particulate slurry is prepared by mixing in excess of twenty-three pounds of sized particulate per gallon of viscosified fluid in a mixing vessel containing a predetermined viscosifier in a predetermined amount per gallon of aqueous fluid present. The slurry may contain additional fluid loss control additives, crosslinkers, gel breakers, Ph control additives or buffers, bactericides, epoxy or plastic resins, resin curing agents, surfactants, salts, coupling agents and the like. A pad fluid comprising a fluid having a viscosity similar to that of the slurry carrier fluid is introduced into the wellbore and pumped through the production casing to enter the annulus through appropriate conventional downhole tools in the target formation. The viscosifier in the pad fluid creates a filter cake on the formation face as a result of fluid leak-off. After formation of at least a partial filter cake, the high density slurry is introduced through the wellbore to enter the annulus in the target formation. The slurry flows from the production casing into the annulus to substantially fill the annulus and create a uniform density pack about the casing. The fluid slurry experiences very little fluid loss to the formation and the particulate, as a result of its high concentration, settles very little within the annulus. When a substantially horizontal wellbore is treated, the slurry contains sufficient particulate that the entire exterior surface of the production casing is covered by the particulate upon reduction in viscosity of the viscosified fluid and any subsequent settling of the particulate.

The present invention has a number of advantages over the prior art. The proposed methods result in a high conductivity region surrounding the wellbore without undesired dunning or settling occurring whereby casing is exposed within the wellbore. The method is amenable to mixing on-the-fly or continuously and may be utilized to secure production casing along a target formation without cementing thereby avoiding undue contamination or formation damage.

DESCRIPTION OF THE PREFERRED EMBODIMENT

Figure 1:
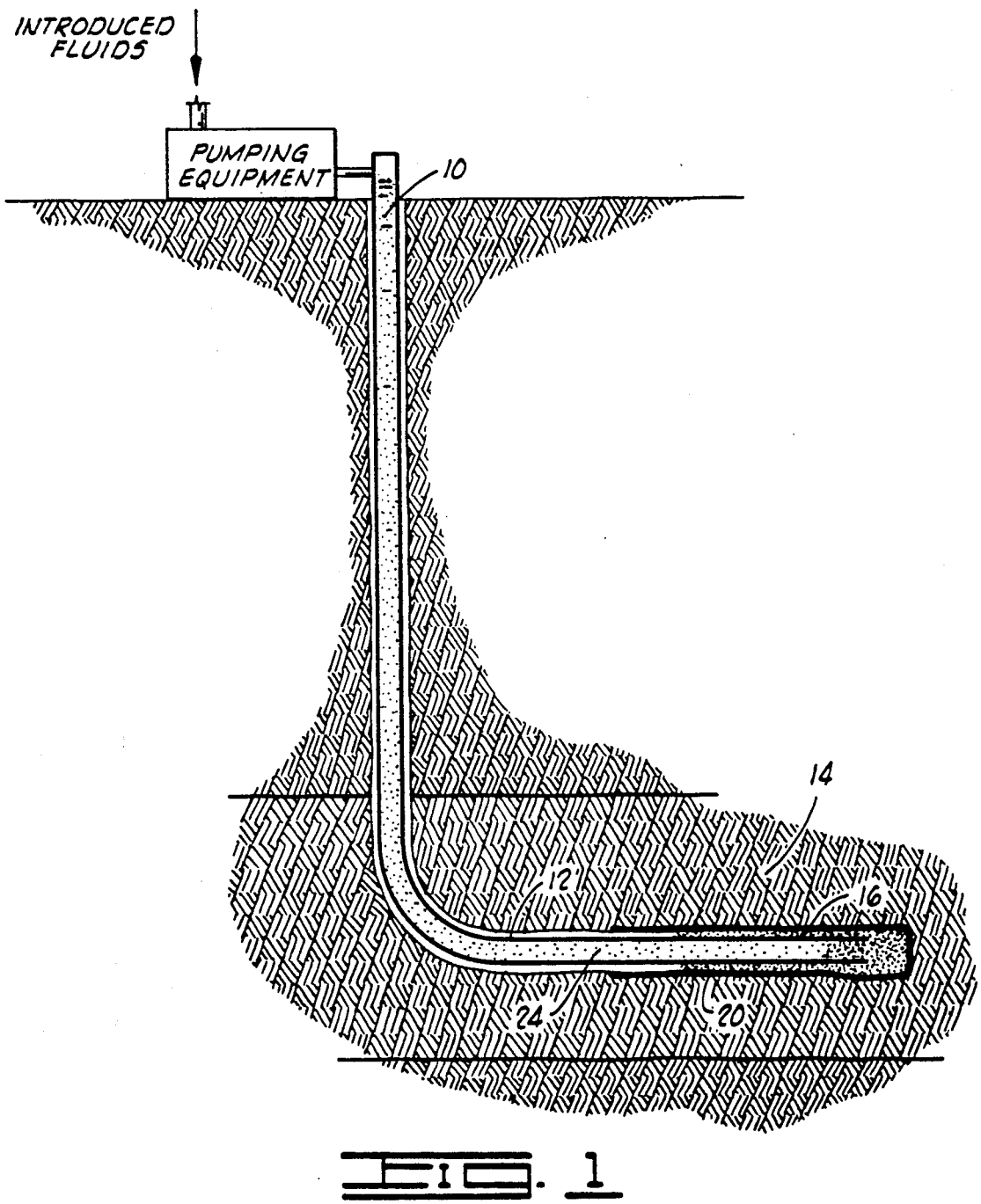
FIG. 1 generally schematically illustrates the introduction of a high density slurry into a subterranean formation.

The general method of the invention is illustrated schematically in FIG. 1 comprising a substantially horizontal wellbore 10 having a production casing 12 located in a target formation 14 from which it is desired to produce hydrocarbons. A pad fluid is prepared by admixing a selected viscosifier with an aqueous fluid in an amount sufficient to produce a filter cake upon contact with the target formation. The pad fluid is introduced through casing 12 and into annulus 16 within formation 14 whereupon a filter cake 20 is created upon the face of the formation as fluid is lost from the pad fluid. The filter cake 20 retards fluid loss from the high density slurry which is subsequently introduced to substantially fill a desired portion of the annulus 16 in formation 14. The pad fluid is prepared by hydrating a viscosifing agent in an aqueous fluid. The aqueous fluid can comprise fresh water, brine, sea water, or various salt solutions such as potassium chloride solution and the like. The viscosifying agent can comprise substantially any of the known polysaccharide polymer viscosifying agents such as guar gum, derivatized guars, derivatized cellulosics such as hydroxyethylcellulose, derivatives of starch, polyvinyl alcohols, acrylamides, xanthan gums and the like. A specific example of a suitable viscosifying agent is hydroxyethylcellulose, guar gum or xanthan gum present in an amount of from about 0.6 to about 0.3 weight percent in the fluid. The aqueous fluid also can include conventional buffers, gel breakers, fluid loss additives, surfactants, crosslinking agents and the like. Those individuals skilled in the art may readily select a viscosifier and breaker from those well known in the art to prepare a pad fluid having a viscosity similar to or greater than the viscosity of the high density slurry.

The high density slurry is prepared by admixing in excess of about 23 pounds of a selected particulate material with a gallon of a selected viscosified fluid. The viscosified fluid can comprise the same fluid as the pad fluid or another fluid prepared in the same manner as the pad fluid having a selected viscosity. The viscosity of the pad fluid is selected to provide appropriate fluid loss control. The viscosified fluid can be crosslinked, if desired, to enhance its particulate transport capability. The appropriate viscosity, particulate particle size and concentration relationships are set forth in the following table.

Data from lower particulate-containing slurries is provided to aid in comparing the present invention to conventional fluids.

| Sand Concentration lbs/gal fluid | Series U.S. Seive Mesh sizes Range | | Viscosifying Agent lbs/1000 gal fluid | | |
| --- | --- | --- | --- | --- | --- |
| | | | cellulose derivative | xanthan gum | crosslinked polysaccharide |
| Conventional | | | | | |
| 1-2 | 8/12 | 20/40 | 5-10 | 2.5-7.5 | — |
| 1-4 | 20/40 | 40/60 | 5-10 | 2.5-7.5 | — |
| 5-10 | 20/40 | 40/60 | 40-60 | 30-40 | 30-40 |
| 10-15 | 8/12 | 40/60 | 80-100 | 50-60 | 50-60 |
| 15-20 | 8/12 | 40/60 | 80-100 | 50-60 | 50-60 |
| Present Invention | | | | | |
| 24-26 | 8/12 | 40/60 | 50-60 | 25-30 | 25-30 |
| 26-28 | 8/12 | 40/60 | 40-50 | 20-25 | 25-30 |
| 28-30+ | 8/12 | 40/60 | 30-40 | 15-20 | 25-30 |

Surprisingly, it has been found that the viscosity of the carrier fluid must be reduced to successfully fluidize larger quantities of a selected particulate thereby reducing the quantity of polymer required to perform a treatment. For example, a 28 lb per gallon slurry of 20/40 mesh sand is prepared by admixing the sand in a fluid viscosified with hydroxyethylcellulose in an amount of about 50 lb/1000 gallon of aqueous fluid. A 28 lb per gallon slurry of 40/60 mesh sand may be prepared by admixing the sand in a fluid viscosified with hydroxyethylcellulose in an amount of about 40 lb/1000 gallon of aqueous fluid. A 25 lb/gallon slurry of 20/40 mesh sand may be prepared by admixing the sand in a fluid viscosified with hydroxyethyl cellulose in an amount of about 50 lb/1000 gallon of aqueous. The specific quantity of particulate present in the viscosified fluid is selected to minimize subsequent settling of the particulate when placed in the wellbore. The high density slurry also is utilized to minimize the quantity of fluid that is introduced into the subterranean formation. The high density slurry is introduced into the wellbore and pumped through casing 12 to enter the annulus 16 through conventional downhole tools whereupon the void space present is filled with the high density slurry without significant fluid loss from the slurry. The slurry may be displaced from the casing 12 by any conventional flush fluid 24 that does not adversely react with the slurry. The slurry does not appear to significantly admix with any formation particulate upon introduction into the annulus. In a preferred embodiment of the invention, the particulate contained in the high density slurry is at least partially coated with a resin capable of consolidating the particulate slurry. A preferred method of preparing the resin coated particulate slurry is described in U.S. Pat. No. 4,829,100 incorporated herein by reference utilizing the high particulate density and fluid viscosity taught herein. Generally the preferred method of preparing the high density resin coated slurry is to substantially continuously admix streams of the viscosified fluid, particulate, resin composition and a surface active agent. The particulate is substantially continuously coated with the resin and suspended in the viscosified fluid. The resin has a sufficiently long curing or working time to enable continuous deposition of the slurry in a desired location in a subterranean formation. Subsequent hardening of the resin produces a hard permeable mass of consolidated particulate material.

The viscosified fluid preferably contains a gel breaker which serves to reduce the viscosity of the gel at a time substantially coincident with the completion of the placement of the coated particulate material at the desired location in a subterranean formation. That is, the gel breaker causes the viscosified fluid to revert to a low viscosity liquid which readily separates from the deposited particulate material and leaks-off into permeable strata surrounding the deposit location.

As mentioned above, breaking the viscosified fluid allows it to separate from the particulate material and enter or filter into permeable strata adjacent the deposit location. While a variety of gel breakers which are well known in the prior art can be utilized, an enzyme-type breaker such as cellulase for a derivatized cellulose viscosifying agent and a hemicellulase for a substituted galactomannan gelling agent are preferred.

As is well known in the art, relatively small quantities of the enzyme breaker are generally required, but as is also well known in the art, the particular quantity depends upon the Ph, temperature and specific time period required between addition of the gel breaker and the breaking of the gel. As will be understood, the greater the quantity of gel breaker used, the shorter will be such time period.

The viscosified fluid containing the coated sand can be crosslinked to increase its viscosity if desired. The viscosifying agent can be crosslinked by addition of any of the known crosslinking agents such as various metal chelates such as known titanium, zirconium, aluminum salts, borates, or any other appropriate compounds capable of creating a crosslinking of the viscosifying agent without detrimentally effecting the process of the present invention.

A variety of surface active agents can be utilized to promote substantially instantaneous coating of particulate material with the resin in the presence of a viscosified fluid, but the preferred surface active agent is a mixture of one or more cationic surface active agents and one or more non-cationic surface active agents. As used herein, a non-cationic surface active agent includes a blend of anionic and non-ionic surface active agents.

A surface active agent is the ingredient necessary to produce the substantially instantaneous coating of the particulate material with the epoxy resin in the presence of the gelled aqueous carrier liquid. A noncationic surface active agent will achieve the desired coating when certain galactomannan viscosifying agents are utilized, but the preferred surface active agent is a blend of cationic and non-cationic surface active agents.

The cationic surface active agents useful herein are preferably the reaction product of an alcohol, epichlorohydrin and triethylenediamine wherein monohydric aliphatic alcohols having in the range of from about 12 to about 18 carbon atoms are reacted with from 2 to 3 moles of epichlorohydrin per mole of alcohol followed by reaction with an excess of triethylenediamine. The alcohol-epichlorohydrin reaction product contains an alkoxylation chain having pendent chlorides. The subsequent reaction with triethylenediamine provides a cationic and a tertiary amine functionality to the resulting surfactant product.

The non-cationic surfactants are preferably ethoxylated fatty acids produced by reacting fatty acids containing from about 12 to about 22 carbon atoms with from about 5 to about 20 moles of ethylene oxide per mole of acid, most preferably from about 12 to about 18 moles of ethylene oxide per mole of acid, to produce a mixture of various quantities of ethoxylated acids and unreacted acids.

When the viscosifying agent used herein is a cellulose derivative, then one preferred surface active agent is a blend comprised of isopropyl alcohol, the cationic agent described above and the non-cationic agent described above wherein the weight ratio of cationic agent to non-cationic agent in the blend is in the range of about 0.4 to 1, and preferably about 0.6, parts by weight cationic agent per 1 part by weight non-cationic agent and wherein the weight ratio of isopropyl alcohol to non-cationic agent in the blend is about 1 part by weight alcohol per 1 part by weight non-cationic agent.

When the viscosifying agent used herein is a galactomannan gum, then one preferred surface active agent is a blend comprised of amyl alcohol, the cationic agent described above and the non-cationic agent described above wherein the weight ration of cationic agent to non-cationic agent in the blend is in the range of about 0 to 1, and preferably about 0.2, parts by weight cationic agent per 1 part by weight non-cationic agent and wherein the weight ratio of amyl alcohol to non-cationic agent in the blend is about part by weight alcohol per 1 part by weight non-cationic agent.

The alcohol constituent of the above described blends functions as a solubilizer and diluent for the cationic and non-cationic surfactants. Appropriate substitutes for any alcohol include other similar alcohols, for example isopropyl alcohol, n-hexanol and fusel oil.

A substantially continuous stream of the surface active agent utilized is mixed with the viscosified fluid, the resin composition and the particulate material at a rate whereby the amount of active surface active agent present in the mixture is in the range of from about 0.25 to about 10.0 gallons of surface active agent per 1000 gallons of viscosified fluid. Most preferably, when a galactomannan gelling agent is used, the active surface active agent is present in the mixture in an amount of about 0.5 gallon per 1000 gallons of viscosified fluid; when a cellulose derivative gelling agent is used, the active surface active agent is present in an amount of about 2 gallons per 1000 gallons of viscosified fluid.

Various types of particulate material can be used in accordance with the present invention, e.g., sand, sintered bauxite, etc. The preferred particulate material is sand, the particle size of which being in the range of from about 8/12 to about 70 mesh U.S. Sieve Series, with the preferred sizes being 10-20 mesh, 20-40 mesh or 40-60 mesh, or 50-70 mesh depending upon the particle size and distribution of formation sand adjacent to which the resin coated sand is to be deposited.

A substantially continuous stream of particulate is combined with the viscosified fluid surface active agent resin composition mixture at a rate whereby the amount of sand present in the mixture is in the range of from about 23 to about 33 pounds of particulate per gallon of viscosified fluid. Most preferably, the particulate is present in the mixture in an amount in the range of from about 25 to about 32 pounds per gallon of fluid.

The resin composition utilized in accordance with this invention for substantially instantaneously coating particulate material in the presence of the above-described surface active agent and viscosified fluid includes a hardenable polyepoxide resin (epoxy resin) and a solvent system. The resin composition may also include a coupling agent, a hardening rate controller and a hardener. In the practice of the present invention, the resin composition preferably includes the hardenable polyepoxide resin (epoxy resin), the solvent system, the coupling agent, the hardening rate controller and the hardener. The resin composition substantially instantaneously coats the particulate material in the presence of the viscosified fluid and the surface active agent.

The resin composition, above defined, is present in the mixture of ingredients in the range of from about 1 to about 20 pounds of resin composition per each 100 pounds of particulate material. It is believed that the density of the resin composition will vary in the range from about 1.05 to about 1.16 grams per milliliter depending upon the specific content of the composition.

While various polyepoxide resins can be utilized, preferred resins are the condensation products of epichlorohydrin and bisphenol A. A commercially available such product is marketed by the Shell Chemical Company of Houston, Texas, under the trade name EPON 828. EPON 828 resin exhibits good temperature stability and chemical resistance and has a viscosity of about 15,000 centipoises.

In one preferred embodiment, the solvent system is comprised of a first, polar, organic diluent which, in all cases, is miscible with the polyepoxide resin and substantially immiscible with water and a second polar, organic, diluent which, in all cases, is miscible with but substantially non-reactive with the polyepoxide resin. The first and second diluents are present in the resin composition in amounts sufficient to adjust the viscosity of the resin composition to a level in the range of from about 100 centipoises to about 800 centipoises.

The first polar organic diluent is present in the resin composition in the range of from about 2 to about 35, preferably from about 15 to about 30 and most preferably about 28 parts by weight per 100 parts by weight of the epoxy resin component. The second polar organic diluent is present in the resin composition in the range of from about 4 to 20, preferably from about 8 to 15 and most preferably about 10 parts by weight per 100 parts by weight of the epoxy resin component.

In a more preferred system, the second polar organic diluent is also substantially immiscible with water.

In the most preferred system, the first polar organic diluent is also substantially reactive with the epoxy resin component.

The preferred first polar organic diluent which is reactive with the epoxy resin component is selected from the group consisting of butyl glycidyl ether, cresol glycidyl ether, allyl glycidyl ether, phenyl glycidyl ether or any other glycidyl ether which is miscible with the epoxy resin. Of these, butyl glycidyl ether and ortho-cresol glycidyl ether are the most preferred. The reactive diluent reacts with the hardening agent and also functions to reduce the viscosity of the epoxy resin.

The second polar organic diluent which is not reactive with the epoxy resin component is essential because it contributes to the lowering of the viscosity of the resin, and in combination with the surface active agent, brings about the substantially instantaneous coating of the particulate material with the resin in the presence of the viscosified fluid.

The preferred non-reactive diluent is of low molecular weight, is miscible with the epoxy resin, is substantially immiscible with water and is selected from the group consisting of compounds having the structural formula:

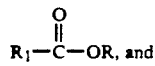, and

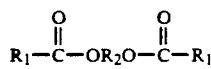

Wherein R is $(C_nH_{2n+1})$ and n is an integer in the range of about 1 to about 5;
$R_1$ is $(C_mH_{2m+1})$ and m is 0 or an integer in the range of from 1 to about 4, or $R_1$ is

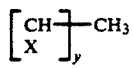

and y is an integer in the range of from 1 to about 4 and X is independently H or OH; and $R_2$ is $C_aH_{2a}$ and a is an integer in the range of from 2 to about 5.

Of the various compounds falling within the group described above, ethyl acetate, butyl lactate, ethyl lactate, amyl acetate, ethylene glycol diacetate and propylene glycoldiacetate are preferred. Of these, butyl lactate is the most preferred. Butyl lactate has a molecular weight of 130 and a water solubility of 1 gram per 1,000 grams of water.

Methyl alcohol which is partially soluble in the polyepoxide resin and other low molecular weight alkanols also are useful second diluents.

Other chemicals such as tetrahydrofurfuryl methacrylate and ethyl acetate can be either the first or the second polar organic diluent as each of these do satisfy the definitions of both types of diluents as set out above.

A variety of hardening agents can be used in this invention to cause the hardening of the resin. Examples of such hardening agents include amines, polyamines, amides and polyamides known to those skilled in the art. A preferred hardening agent is methylene dianiline, either dissolved in a suitable solvent such as ethyl acetate or in a liquid eutectic mixture of amines diluted with methyl alcohol. A particularly preferred hardening agent is a liquid eutectic mixture of amines diluted with about 22% by weight methyl alcohol, the eutectic mixture containing about 79% by weight methylene dianiline with the remaining amines being comprised to primary aromatic amines and meta-phenylene diamine. Such a liquid eutectic mixture is commercially available under the trade name TONOX 22 from the Uniroyal Chemical Company of Naugatuck, Connecticut.

The quantity of hardening agent useful herein is dependent to a great extent upon the chemical nature of the hardener itself. It is, accordingly, difficult to specify in detail the amount of hardener to be used. However, in a broad sense, it is believed that the hardener is present in the range of from about 2 to about 150 parts by weight per 100 parts by weight of epoxy resin. When the hardener is an aromatic amine, the weight range is from about 8 to about 50. One aromatic amine, methylene dianiline, is useful when present in the range of from about 25 to about 38 parts by weight per 100 parts by weight of epoxy resin. When the hardener is an aliphatic amine, for example a dimethylaminomethyl substituted phenol, the hardener weight range is from about 2 to about 15 parts by weight per 100 parts by weight of epoxy resin.

The mixture of ingredients also preferably includes a resin-to-particulate material coupling agent to promote bonding of the resin to the particulate material such as a functional silane. Preferably, a N-beta-(aminoethyl)-gamma-aminopropyltrimethoxysilane resin-to-sand coupling agent is included in an amount in the range of from about 0.1 to about 2 parts by weight per 100 parts by weight of epoxy resin. A commercially available product is Union Carbide Silane A-1120 (Danbury, Connecticut).

The mixture can also include retarders or accelerators as hardening rate controllers to lengthen or shorten the working and cure times of the resin. When retarders are used, low molecular weight organic acid ester retarders are preferred. Examples of such retarders are alkyl esters of low molecular weight alkyl acids containing about 2 to 3 carbon atoms. Suitable accelerators include 2,4,6-tris dimethyl amino methyl phenol, the ethyl hexonate salt thereof and weak organic acids such as fumaric, erythorbic, ascorbic, salicylic and maleic acids. If a retarder or accelerator is utilized, it is combined therewith in an amount up to about 0 to 10 parts by weight per 100 parts by weight of epoxy resin.

As mentioned above, if it is desired to increase the viscosity of the pad fluid or viscosified fluid resin composition coated particulate material slurry, a continuous stream of liquid crosslinker can be combined with the viscosified fluid depending upon the type of viscosifier utilized. Examples of crosslinkers which can be utilized are those selected from the group consisting of titanium, aluminum, zirconium and borate salts. Preferred crosslinkers are titanium lactate, titanium triethanolamine, aluminum acetate and zirconium salts. Generally, the crosslinker used is in the form of a solvent containing solution which is combined with the fluid at a rate which results in the crosslinker being present in an amount equivalent to the range of from about 0.05 to about 5.0 gallons of an approximately 30% by weight solution of the crosslinker per 1000 gallons of viscosified fluid. Also, depending upon the particular crosslinker used, a Ph buffering agent may be combined with the fluid.

Based upon 100 parts by weight of epoxy resin, the resin composition is preferably comprised of the abovedescribed epichlorohydrin-bisphenol A epoxy resin (i00 parts by weight) a water immiscible reactive diluent comprised of ortho-cresol glycidyl ether present in an amount in the range of from about 20 parts by weight to about 35 parts by weight, a non-reactive diluent comprised of butyl lactate present in an amount in the range of from about 4 parts by weight to about 123 parts by weight and a hardening agent comprised of a water miscible solvent diluted liquid eutectic mixture of primary aromatic amines, methylene dianiline and metaphenylene diamine present in an amount in the range of from about 25 parts by weight to about 45 parts by weight. When the water immiscible reactive diluent used in the resin composition is butyl glycidyl ether instead of ortho-cresol glycidyl ether, it is present in an amount in the range of from about 2 parts by weight to about 20 parts by weight.

The above-described resin composition has a viscosity in the range of from about 400 centipoises to about 150 centipoises and has an approximate working time without retarders or accelerators present, i.e., a time period between mixing and when the viscosity of the composition exceeds about 1500 centipoises, of about 2 hours at normal ambient conditions (about 72° F.) The cure time for the resin composition, i.e., the time from when the viscosity reaches about 1500 centipoises to when the viscosity reaches about 1500 centipoises to when the resin composition has fully hardened is about 80 hours at 72° F.

A specific preferred resin composition for use in accordance with the present invention is comprised of 100 parts by weight of an epichlorohydrin and bisphenol A epoxy resin, butyl glycidyl ether present in an amount of about 11 parts by weight, butyl lactate present in an amount of about 8 parts by weight, a liquid eutectic mixture of primary aromatic amines, methylene dianiline and metaphenylene diamine diluted with about 22% by weight methyl alcohol present in an amount of about 36 parts by weight, N-beta (aminoethyl)-gamma-aminopropyltrimethoxysilane present in an amount of about 0.8 parts by weight and the ethyl hexonate salt of dimethyl amino methyl phenol present in an amount of about 7 parts by weight. This resin composition has a viscosity of about 200 centipoises, a working time of about 0.5 hours and a cure time of about 8 hours at 80° F. When the accelerator (ethyl hexonate salt of dimethyl amino methyl phenol) is not present in the composition, it has a working time of about 2.0 hours and a cure time of about 84 hours.

The resin coated particulate material can be utilized in the performance of gravel packing procedures or as a proppant material in fracturing treatments performed upon a subterranean formation. The resin coated particulate also can be utilized in the formation of controlled permeability synthetic formations within a zone of a subterranean formation.

A significant aspect of the methods of this invention is the ability to substantially instantaneously coat the particulate material with the resin composition and continuously suspend the coated particulate material in a continuous stream of viscosified fluid. This is accomplished by the particular resin composition and combination of component streams which promote the coating of the resin composition on the particulate material. The continuous stream of viscosified fluid resin coated particulate material slurry formed is generally insensitive to variations in Ph within the range of from about 5 to about 8.5 and variations in temperature within the range of from about 45° F. to about 100° F. The cure time of the resin composition can be short, i.e., less than about 6 hours and the resin composition can acquire substantial strength rapidly, i.e., within a time period of about 12 hours or less.

As is well understood by those skilled in the art, it may be desirable to perform after-flushes to insure uniform placement, consolidation and maximum permeability of the deposited particulate material as well as of particulate material existing in the formation utilizing known conventional fluids.

Once the resin coated slurry injected into annulus 16 has consolidated around the production casing to form a high conductivity region, the casing can be perforated or otherwise slotted to expose flow paths for hydrocarbons or other fluids into the production casing. The formation then may be stimulated by conventional fracturing treatments. After stimulation, the casing may be re-perforated to provide additional flow paths into the casing. Where extensive migration of formation sands through the gravel pack is expected, a slotted liner or perforated screen may be positioned within the production casing.

The placement of the resin coated particulate may be accomplished by pumping the slurry down through tubing comprising a workstring positioned within the production casing and preferably through a casing shoe or float shoe or cementing tool to enter the annulus surrounding the casing. Generally, the slurry is pumped through the workstring to the farthest point to be treated and then flowed back along the outside of the production casing to fill the annulus. However it is to be understood that other methods of introduction also may be utilized. If desired, several tools may be utilized whereby the void outside the casing may be filled in stages or different portions of the bore may be isolated. The resin coated particulate, upon setting, provides a consolidated high conductivity region completely covering or surrounding the production casing to assist in stabilizing the formation surrounding the casing in the wellbore with a minimum of fluid introduced into the formation.

In order to further illustrate the methods of the present invention and facilitate a clear understanding thereof, the following examples are given.

EXAMPLE

To determine if a particular fluid would remain pumpable and adequately support particulate while introduced into a subterranean formation the following tests were performed.

Fluid samples were prepared by admixing quantities of a viscosifying agent comprising hydroxyethylcellulose with water in a mixer vessel in an amount sufficient to correspond to the concentrations in lbs per 1000 gallons of fluid set forth below. The pumpability of the fluid then was visually determined and the sand settling rate was measured. The tests were performed at about 74° F.

Sand of a 20/40 mesh size then was admixed with the viscosified fluid in amounts sufficient to provide concentrations corresponding to the levels in lbs/gal of viscosified fluid set forth below.

| Test No. | Concentration Viscosifying Agent, lbs/1000 gal | Particulate Concentration lbs/gal | Pump-ability | Settling Rate cm/sec. |
|---|---|---|---|---|
| 1 | 30 | 26 | yes | 0.36 |
| 2 | 40 | 26 | yes | 0.11 |
| 3 | 60 | 26 | no | — |
| 4 | 30 | 24 | yes | 0.17 |
| 5 | 30 | 28 | yes | 0.13 |

5 Further tests then were performed utilizing a different cellulose derivative as the viscosifying agent. The other conditions remained the same.

| Test No. | Concentration Viscosifying Agent, lbs/1000 gal | Particulate Concentration lbs/gal | Pump-ability | Particulate Settling Rate cm/sec. |
|---|---|---|---|---|
| 6 | 30 | 26 | yes | 0.36 |
| 7 | 40 | 26 | yes | 0.12 |
| 8 | 50 | 26 | yes | 0.07 |
| 9 | 60 | 26 | yes | 0.03 |

The test results clearly illustrate the effect of differing sand concentration and viscosifying agent concentration. Tests 2, 5, 7, 8 and 9 illustrate compositions in accordance with the present invention while tests 1, 4 and 6 have insufficient viscosity to adequately transport particulate into a subterranean formation and test 3 is unpumpable.

While that which is considered to be the preferred embodiments of the invention has been described hereinbefore, it is to be understood that modifications and changes can be made in the methods and compositions without departing from the spirit or scope of the invention as hereinafter set forth in the claims.

What is claimed is:

1. A method of continuously forming and suspending resin coated particulate in a high concentration in a viscosified fluid comprising:

intermixing substantially continuous streams of said viscosified fluid prepared by admixing a predetermined quantity of a hydratable polysaccharide, said polysaccharide being present in an amount of from about 20 to about 60 pounds per 1000 gallons of fluid, with an aqueous fluid, a particulate material present in a predetermined amount of from about 23 to about 33 pounds per gallon of aqueous fluid, a surface active agent and a resin composition which can be caused to harden, whereby said particulate is substantially continuously coated with said resin composition and suspended in said viscosified fluid, said resin composition comprising a hardenable polyepoxide resin, a substantially water immiscible non-reactive diluent for said resin, a substantially water immiscible reactive diluent for said resin, said diluents being present in an amount sufficient to lower the viscosity of the resin composition to a level below about 800 centipoise at ambient temperature.

2. The method of claim 1 wherein said reactive diluent is present in an amount of from about 2 to about 35 parts per 100 parts by weight of said polyepoxide resin and said nonreactive diluent is present in an amount of from about 4 to about 20 parts per 100 parts by weight of said polyepoxide resin.

3. The method of claim 1 wherein said particulate is present in an amount of from about 25 to about 32 pounds per 1000 gallons of viscosified fluid.

4. The method of claim 1 wherein said viscosified fluid includes a crosslinking agent comprising at least one member selected from the group consisting of titanium, aluminum and zirconium chelates.

5. A method of well completion comprising the steps of:

injecting a consolidatable particulate slurry through unperforated casing in the production zone of a producing formation such that the slurry flows into the annulus formed between the casing and the wellbore to substantially surround said casing, said slurry containing in excess of 23 pounds of particulate per gallon of fluid present;

consolidating said particulate slurry; and perforating the casing and consolidated particulate slurry.

6. The method of claim 5 wherein said slurry contains a viscosifying agent comprising a hydratable polysaccharide in an amount of from about 20 to about 60 pounds per 1000 gallons of fluid.

7. The method of claim 5 wherein a viscosified pad fluid is introduced into the annulus in said production zone prior to introduction of said particulate slurry.

8. The method of claim 5 wherein said casing terminates in a slotted liner and said slurry is utilized to form a gravel pack between said liner and the wellbore.

9. A method of completing a deviated well comprising the steps of:

introducing a viscosified pad fluid through unperforated casing set in a wellbore to contact the subterranean formation in a desired zone;

injecting a consolidatable particulate slurry through said casing to fill a portion of the annulus contacted by said pad fluid, said slurry having a viscosity at least about equal to the viscosity of said pad fluid and containing in excess of about 23 pounds of particulate per gallon of fluid, consolidating at least a portion of said slurry within said desired zone; and perforating said casing to provide communication through said consolidated particulate with said formation.

10. A method of well completion within a subterranean formation comprising the steps of:

introducing a viscosified pad fluid through casing set in a wellbore to contact said formation in a desired zone, injecting a particulate slurry through said casing after injection of said pad fluid, said slurry having a viscosity at least about the same as the viscosity of said pad fluid and containing in excess of about 23 pounds of particulate per gallon of fluid, contacting said subterranean formation with said particulate slurry in a desired zone; and depositing particulate in said desired zone without significant fluid leak-off to said subterranean formation.

11. The method of claim 10 wherein said particulate is present in an amount of from about 25 to about 32 pounds per gallon of viscosified fluid.

12. The method of claim 10 wherein said viscosified slurry is prepared by addition of particulate to a viscosified fluid prepared by admixing from about 30 to about 60 pounds of a cellulose derivative of fluid with an aqueous fluid.

13. The method of claim 10 wherein said slurry contains a viscosifying agent comprising a hydratable polysaccharide present in an amount of from about 20 to about 60 pounds per 1000 gallons of fluid.

14. The method of claim 13 wherein said viscosified fluid includes a crosslinking agent comprising at least one member selected from the group of titanium, aluminum and zirconium chelates.

* * * * *